Dec. 15, 1970     D. E. BLAKE     3,546,986

METHOD OF CUTTING A ROTATING PIPE

Original Filed April 3, 1967     4 Sheets-Sheet 1

INVENTOR
DONALD E. BLAKE

INVENTOR
DONALD E. BLAKE

Dec. 15, 1970      D. E. BLAKE      3,546,986
METHOD OF CUTTING A ROTATING PIPE
Original Filed April 3, 1967      4 Sheets-Sheet 3
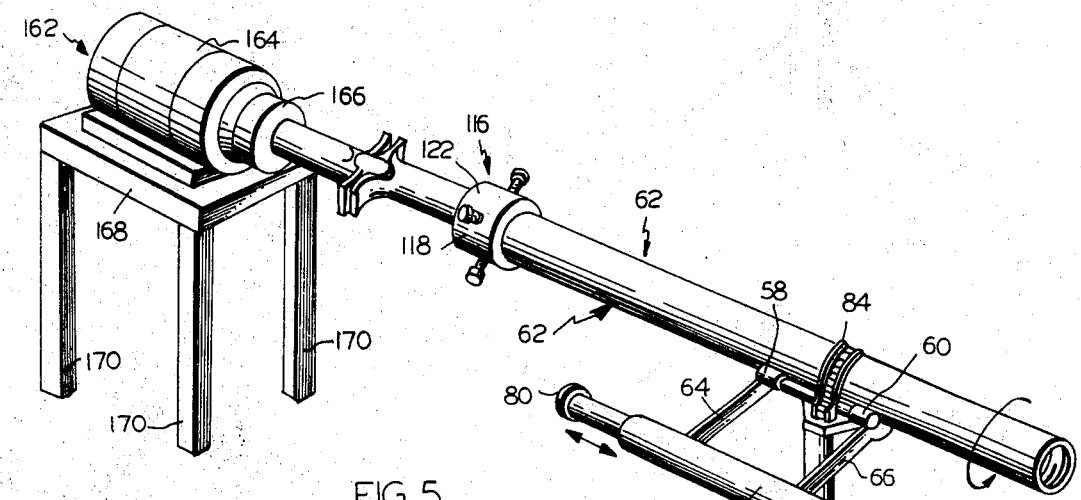
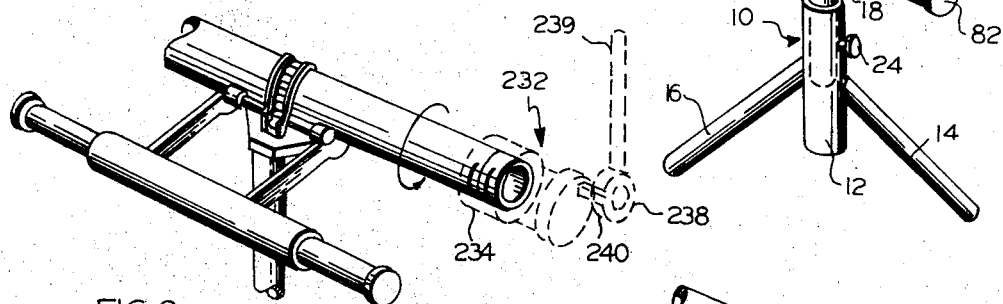
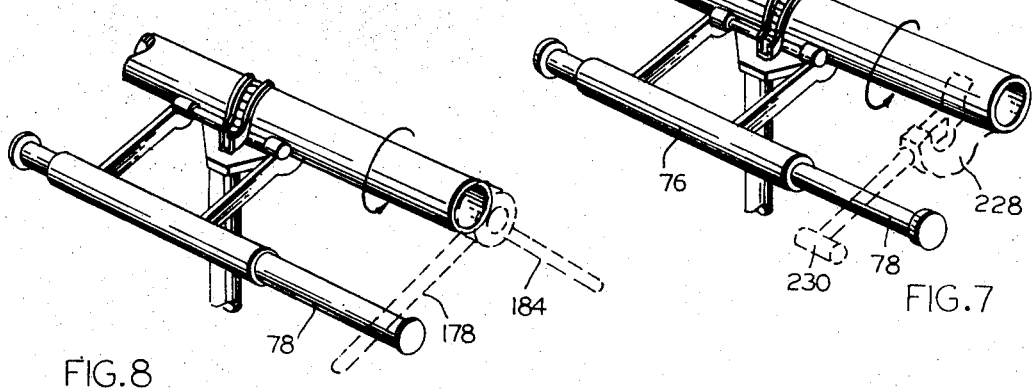
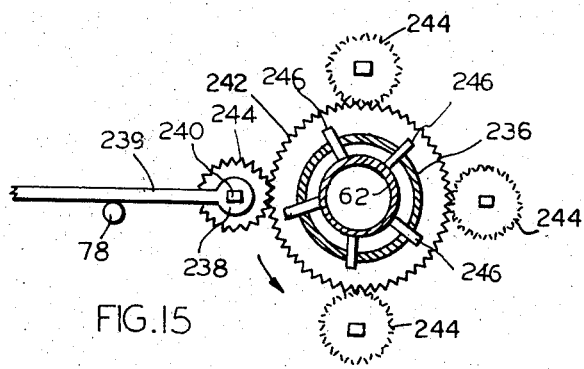
INVENTOR
DONALD E. BLAKE

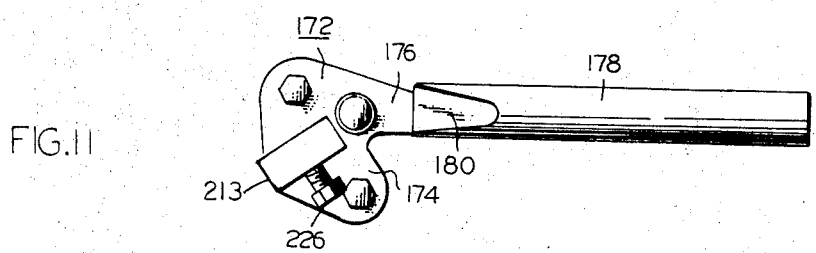
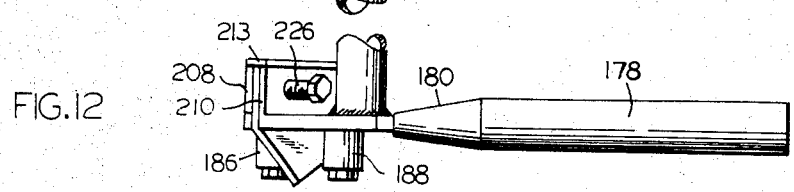
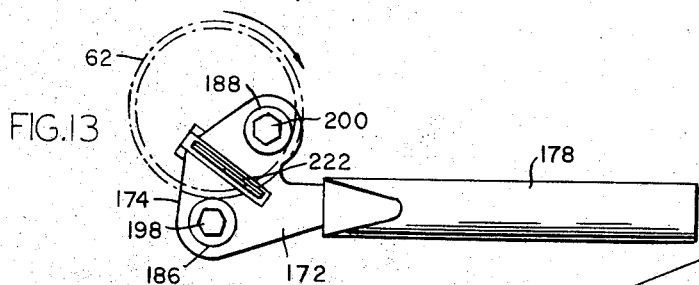
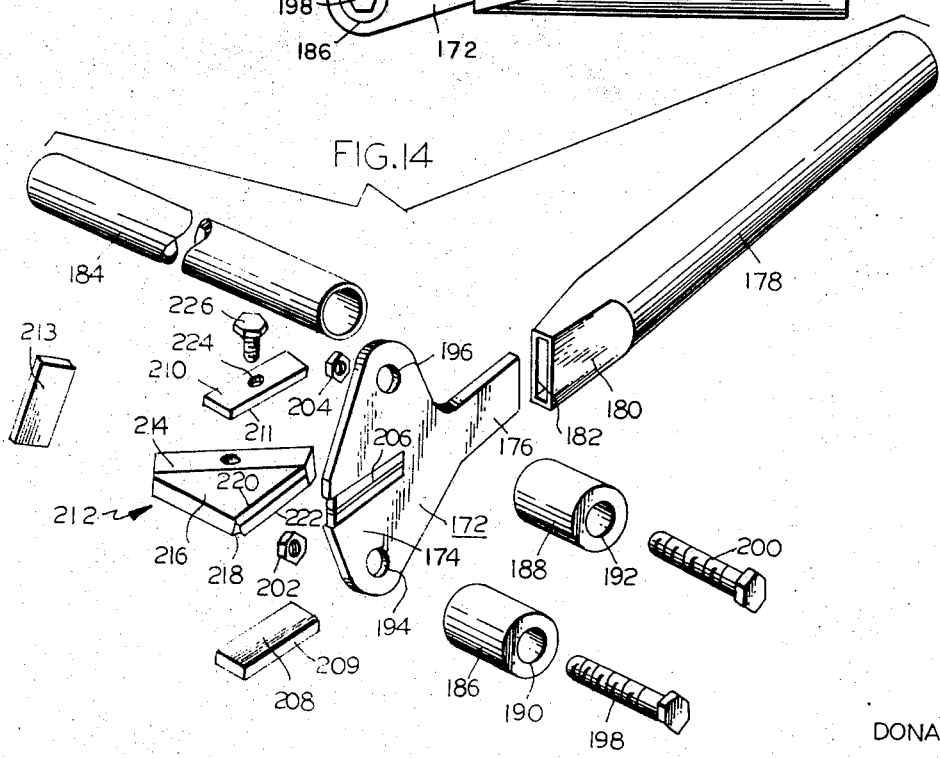
INVENTOR
DONALD E. BLAKE

United States Patent Office 3,546,986
Patented Dec. 15, 1970

3,546,986
METHOD OF CUTTING A ROTATING PIPE
Donald E. Blake, 761 Chestnut Ridge Road,
Morgantown, W. Va. 26505
Original application Apr. 3, 1967, Ser. No. 627,694, now Patent No. 3,445,871, dated May 27, 1969. Divided and this application Feb. 18, 1969, Ser. No. 840,551
Int. Cl. B23b 1/00
U.S. Cl. 82—47   1 Claim

ABSTRACT OF THE DISCLOSURE

A method is provided for the cutting of pipes wherein a portable rotary power source such as a power vise may be employed to rotatably drive the pipe. The method involves establishing a universal driving connection between a pipe to be worked and a rotary power source, rotatably securing the pipe in a vise means supported for rotation about multiple axes, and then rotatably driving the pipe and applying a cutting tool to the portion thereof to be worked.

---

This is a division of Blade application Ser. No. 627,694, filed Apr. 3, 1967, now U.S. Pat. No. 3,445,871, issued May 27, 1969.

This invention relates to a pipe working apparatus and, more particularly, to an apparatus for use in combination with pipe working tools and a portable source of rotary power for the cutting, reaming and threading of pipe of larger diameters. The invention also relates to a new and improved reamer for use in reaming pipes of larger diameters and, more particularly, to a reamer having a cutting means which can be selectively adjusted so that the reamer can be used to ream pipes of several different sizes.

The invention furthermore relates to methods of cutting, reaming and threading pipe and, more particularly, to methods of cutting, reaming and threading pipe of larger diameters wherein a portable rotary power source such as a power vise may be employed to rotatably drive a pipe to be worked. The invention still further relates to a method of sequentially cutting, reaming and threading pipe and, more particularly, to a method of sequentially cutting, reaming and threading pipe of larger diameters in a single work set-up wherein a portable rotary power source such as a power vise may be employed to rotatably drive a pipe to be worked.

Presently in the plumbing trade, cutting, reaming and threading of pipe of less than 2½" in diameter is accomplished rather quickly and easily by the use of a portable rotary power source commonly referred to as a power vise or power drive. This device is basically a motor driven chuck which is mounted on a stand or legs, and when used with pipe working tools, such as a cutter, a reamer and a die head, provides a readily available source of power for the cutting, reaming and threading of pipe up to 2" in diameter in a single work set-up. The power vise is a relatively lightweight and inexpensive piece of equipment which can be easily transported from job-to-job, and one which is owned and used by practically every plumber in the trade.

Due to its size and more particularly to the size of its chuck which can accommodate pipe only up to 2" in diameter, the power vise cannot be used as a power source for the cutting, reaming and threading of pipe of diameters in excess of 2", i.e., diameters ranging between 2½" and 6". The power drive can be used as a source of power for the threading only of this larger diameter pipe, if the threading is accomplished by means of a geared threader, but the cutting and reaming of such pipe must be done either through the use of other tools or other machinery or by hand, which of course necessitates a separate work set-up for the cutting and reaming operations and another separate work set-up for the threading operation. As is commonly done in most work situations, the larger diameter pipe is first cut and reamed by hand in one work set-up, and then the pipe is threaded with the power vise and geared threader in another work set-up. The two work set-ups, of course, result in a loss of time, and the hand cutting and reaming of the pipe involves great amounts of hard labor and many expensive man-hours of time.

If the power vise is used in combination with a geared threader to apply threads to larger diameter pipe, additional or auxiliary equipment must be used with the geared threader to accomplish the threading operation. A universal drive shaft is one such piece of auxiliary equipment and it is used to provide a direct drive between the chuck of the power vise and the drive pinion of the geared threader. The geared threader can also be mounted on or attached to the power vise with the drive pinion thereof being driven directly by the chuck of the power vise. This arrangement requires the use of a drive bar and adjustable pipe supports, as well as some other pieces of auxiliary equipment, and the geared threader remains fixed to the power vise with the die head of the threader also remaining fixed and the pipe being rotated by the work holder or barrel of the threader into thread-cutting engagement with the cutting dies. Such an arrangement requires near perfect axial alignment between the axis of rotation of the pipe and the axis of rotation of the barrel or work holder of the geared threader and setting-up or arranging the pipe and geared threader to attain such alignment requires a large expenditure of time. If such an alignment is not attained, binding or breaking of the threader die head will occur and the cutting of threads will be accompanied by excessive wear of the threader drive pinion and ring gear.

The cutting, reaming and threading of pipe of larger diameters in a single work set-up can be accomplished with some existing machines or devices, but such machines or devices constitute heavy pieces of equipment and, in addition, are most expensive. Such machines or devices are suitable for use only as fixed installations and, as a consequence, cannot be easily and inexpensively transported by a plumber from one job to another. Most plumbers, furthermore, cannot afford the capital investment involved in such machines or devices.

The present invention contemplates an inexpensive and lightweight apparatus adapted for use in combination with pipe working tools for the cutting, reaming and threading of pipe of larger diameters in a single work set-up using a conventional power vise as a source of power. The apparatus operates to rotatably support and establish a universal driving connection between a pipe and a power vise and, structurally, includes a stand which carries a platform or head rotatable about two axes. A roller vise for rotatably supporting the pipe to be worked is affixed to the rotatable head and the vise includes a plurality of rollers in combination with a quickly connectable and disconnectable chain. One extremity of the pipe is connected to the chuck of the power vise through the medium of an adapter and a drive shaft with a universal joint therein. An adjustable tool support means is also carried by the head and, when it is desired to cut, ream and thread the opposite extremity of the pipe, the tool support arm is employed to support the handles of the pipe working tools. The universal joint eliminates the need of exact alignment between the axis of rotation of the pipe and the axis of rotation of the power source and, as the pipe is rotatably driven, the rotatable head moves about its axes in response to any eccentric rotation of the pipe and thereby affords automatic alignment between the rotating pipe and the roller vise. With the rotating pipe and roller vise being so aligned, the pipe can be quickly, accurately and sequentially cut, reamed and threaded in a single work set-up.

The novel reamer of the present invention is comprised of a plate-like body member having a pair of handles and a pair of guide members mounted thereon. The body member carries a cutting blade which is adjustable relative thereto with the blade being positioned on the body member intermediate the guide members. In use, the blade of the reamer is inserted into the end of a cut pipe with one of the guide members being positioned on the outer periphery of the pipe and the other of the guide members being positioned on the inner periphery of the pipe. With the pipe being power driven or power-rotated and the blade being adjusted so that the cutting edge thereof will engage the inner peripheral surface of the pipe, the burr on such inner peripheral surface can be quickly and easily removed.

The methods contemplated by the present invention of cutting, reaming and threading pipe of large diameters consist of first establishing a universal driving connection between a pipe to be worked and a rotary power source, which may be a portable rotary power source such as a power vise. The pipe is then rotatably secured in a vise means which is supported for movement about multiple axes. The pipe is next rotatably driven by the power source and then cut, reamed and threaded by the application of cutting, reaming and threading tools to the portion thereof desired to be worked. The methods when practiced sequentially, in effect, constitute a new and improved method of cutting, reaming and threading a pipe in a single work set-up.

Accordingly, one object of the present invention is to provide a portable and inexpensive apparatus which will afford the cutting, reaming and threading of pipe of larger diameters in a single work set-up.

Another object of the invention is to provide an apparatus which will afford power cutting, reaming and threading of pipe of larger diameters using a conventional power vise as a source of power.

Another object of the invention is to provide an apparatus for use in power cutting, reaming and threading of pipe which eliminates the need of alignment between the axis of rotation of the pipe being worked and the axis of rotation of the power source employed to drive the pipe.

Another object of the invention is to provide a selectively adjustable reamer which can be employed to ream pipes of different sizes.

Another object of the invention is to provide a reamer which will afford quick and easy reaming of power-driven pipes of larger diameters.

Another object of the invention is to provide methods of cutting, reaming and threading pipe of larger diameters.

Another object of the invention is to provide a method of cutting, reaming and threading pipe in a single work set-up.

These and other objects of the present invention will become better understood from the following detailed description of one specific embodiment thereof when taken in connection with the accompanying drawings wherein like components are designated by like reference numerals throughout and wherein:

FIG. 5 is a perspective view of the apparatus illustrating a pipe being retained on the head by the roller vise and the pipe being drivingly connected to the power vise;

FIG. 7 is a fragmentary perspective view of the apparatus illustrating a cutting tool being applied to a pipe;

FIG. 8 is another fragmentary perspective view of the apparatus illustrating the reaming tool of the present invention being applied to a pipe;

FIG. 9 is another fragmentary perspective view illustrating the apparatus being used in a threading operation with a geared threader;

FIG. 11 is a rear elevation of the reamer;

FIG. 12 is a top plan view of the reamer;

FIG. 13 is a front elevation of the reamer;

FIG. 14 is an exploded perspective view of the reamer illustrating all of the components thereof; and FIG. 15 is a schematic representation illustrating the operation of a geared threader when used with the apparatus of the present invention.

Figure 1:
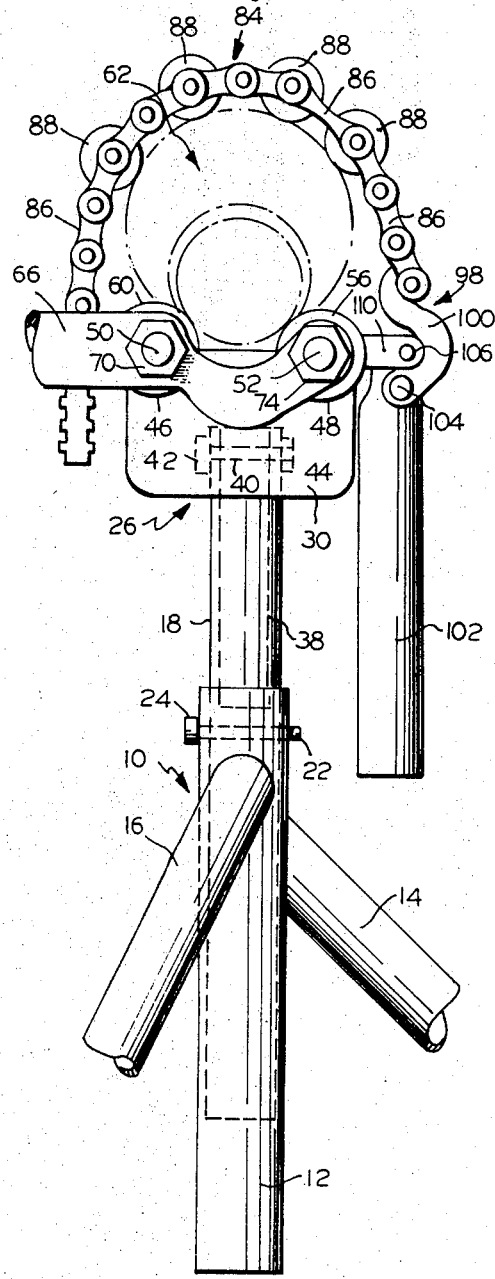
FIG. 1 is an end elevation of the apparatus illustrating some of the components thereof and illustrating the strand, pipe-supporting head and roller vise in particular.

Referring more particularly to FIGS. 1–4 of the drawings, the apparatus is shown as including a stand means or stand generally indicated by the reference numeral 10 comprised of a substantially upright frame member 12, frame member 12 in this one specific embodiment of the invention assuming the form of a hollow, elongated cylinder. A plurality of leg members are rigidly connected to frame member 12 and, in function, are adapted to hold frame member 12 in a substantially upright position on a solid surface such as a floor or the ground. Three leg members are employed in this particular instance, although only two of such leg members 14 and 16 are shown in the drawings. The leg members likewise assume the form of hollow cylinders, and one end of each leg member is rigidly connected to frame member 12. The leg members are connected to frame member 12 by welding in this particular instance, although it will be appreciated that any other suitable means of connecting the leg members to the frame member could be employed.

Figure 2:
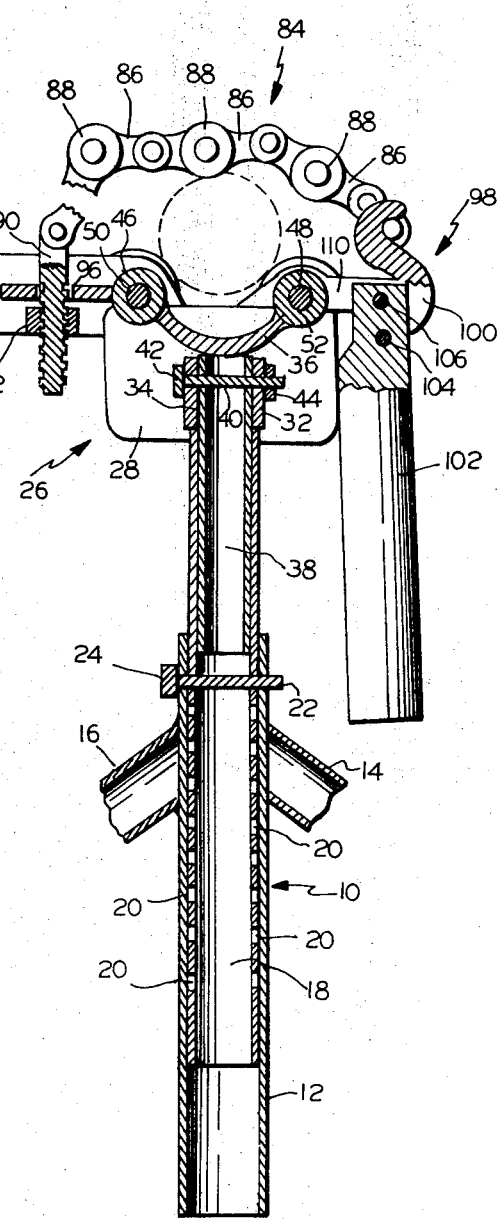
FIG. 2 is a partial longitudinal section through the apparatus shown in FIG. 1.

Frame member 12 slidably and snugly reecives a column means or column member 18, column member 18 likewise taking the form of an elongated hollow cylinder, and intermediate the ends thereof having a plurality of spaced and radially aligned holes or ports 20 therein (FIG. 2). Ports 20 are adapted to receive a pin 22 which is also reecived within a pair of radially aligned or diametrically opposed holes or ports (no reference numerals) in frame member 12. Pin 22 in combination with the plurality of holes 20 in column member 18 and the holes in frame member 12 provides a means for selectively adjusting the height of stand 10. Pin 22 is provided with a head 24 thereon by means of which it may be easily grasped for insertion or removal from the holes.

Frame member 12, leg members 14 and 16 and column member 18, while taking the form of hollow cylindrical elements, could nevertheless assume the form of solid cylindrical elements or, for that matter, could assume any other suitable shape, configuration or cross-section. It is preferable, however, to use hollow members in constructing the stand 10 because of the weight and cost factors involved. The portability and cost of the apparatus of the present invention are, needless to say, both significant attributes thereof.

Stand 10 rotatably carries a head means or pipe supporting head generally indicated by the reference numeral 26. The head 26 broadly serves as a platform or the like for supporting a pipe to be worked and, in this one specific embodiment of the invention, is comprised of a first pair of spaced and opposed members 28 and 30, together with a second pair of spaced and opposed members 32 and 34. The pairs of spaced and opposed members assume the form of flat plates and are spaced a preselected distance apart. The ends of plates 32 and 34 are rigidly secured to the opposing inner faces of plates 28 and 30, with the four plates thus forming a rigid, substantially rectangularly configured frame, the four plates being secured to each other by welding in this particular instance (no fillets shown), although it will be appreciated that any other suitable means of securing the plates could be employed.

As best seen in FIG. 2, plates 28 and 30 are also rigidly connected by a substantially semi-circular plate 36 which extends between the two plates. Plate 36 is likewise rigidly connected to the opposing inner faces of plates 28 and 30, and is so connected to the two plates by welding (fillets not shown). Plate 36 is also rigidly connected to two other components carried by head 26, as will be more fully discussed hereinafter.

Head 26 also includes a shaft means or shaft 38 which in this instance also assumes the form of a hollow, elongated cylinder. Plates 32 and 34 are so spaced and shaft 38 has an outside diameter such that the shaft, or more particularly one extremity thereof, fits snugly within or between the plates. Shaft 38 is provided with a pair of radially aligned holes therein (no reference numerals) which are in alignment with a pair of aligned holes (no reference numerals) in plates 32 and 34, and the pairs of aligned holes in the shaft and plates are adapted to receive a pivot means or pivot which assumes the form of a bolt 40. Bolt 40 has a head 42 on one end thereof and carries a nut 44 on the opposite end thereof. The portion of shaft 38 projecting or depending beyond the plates 32 and 34 is slidably and rotatably received within hollow column member 18 of stand 10, and the bottom surfaces of plates 32 and 34 abut or seat on the upper end wall of column member 18. With shaft 38 being so received within column member 18 and shaft 38 being so pivotally connected to plates 32 and 34, it can readily be seen that the head 26 is not only carried by or mounted on the stand 10, but also is supported for rotation about multiple axes, one of the axes being defined by bolt 40 and the other being defined by the axis of rotation of shaft 38.

A vise means or vise (no reference numerals) for rotatably supporting a pipe to be worked is carried by head 26 and the vise means in this instance takes the form of a roller vise. The roller vise includes a pair of substantially parallel tubular members 46 and 48 mounted on plates 28 and 30, the tubular members being spaced a preselected distance apart and being seated in pairs of semi-circular recesses (no reference numerals) in the top walls of the two plates and being secured to the two plates by welding. The semi-circular plate 36 secured to plates 28 and 30 also extends between the two tubular members 46 and 48 and is rigidly secured to the two tubular members (FIG. 2) in this particular instance by welding. In being rigidly connected to plates 28 and 30 and to the two tubular members 46 and 48, semi-circular plate 36 thus adds rigidity to the head 26. Tubular members 46 and 48 are adapted to receive shafts 50 and 52, respectively. Each shaft in turn rotatably carries a pair of rollers, shaft 50 carrying rollers 58 and 60 and shaft 52 carrying rollers 54 and 56. The rollers in this instance assume the form of anti-friction bearings, although it will be appreciated that any other suitable type of roller could be employed. The rollers, as essential components of the roller vise, in function, are adapted to rotatably support a pipe to be worked, such a pipe being shown in the drawings as being in engagement with the rollers and being designated by the reference numeral 62.

Bolts 50 and 52 also carry a pair of arm members 64 and 66, the arm members having a tool support means connected thereto, as will also be discussed more fully hereinafter. The bolts 50 and 52 extend through pairs of holes in the arm members (no reference numerals) and the arm members 64 and 66 and the two pairs of rollers 54–56 and 56–58 are held in rigid assembly on the two bolts by pairs of nuts 68–70 and 72–74, which nuts are carried on the threaded ends (not shown) of the two shafts. Spacers (not shown) are carried on the two shafts to separate the arm members and the rollers to insure freedom of rotation of the rollers. As best seen in FIGS. 1 and 2, the arm members 64 and 66 each terminate in a substantially U-shaped portion (no reference numeral) at the end where each is connected to the two shafts 50 and 52 so as not to interfere with the seating of pipe 62 on the rollers.

An elongated hollow member 76 is rigidly connected to the ends of arms 64 and 66 and, in this instance, member 76 takes the form of a hollow cylinder. Member 76 is attached to the ends of the arms by welding, although it will be appreciated that any other suitable means of attachment could be employed. A rigid tool support means or support member 78 is slidably received within hollow member 76, the tool support member 78 also assuming the form of a hollow cylinder. The ends of tool support member 78 are threaded (threads not shown) and carry enlarged, threaded end caps or the like 80 and 82 which prevent tool support member 78 from becoming separated from hollow member 76.

The roller vise also includes a chain means or chain for holding pipe 62 on the head 26 and more particularly for urging the pipe into engagement with the pairs of rollers 54–56 and 58–60, the chain being generally indicated by the reference numeral 84. Chain 84 is comprised of a plurality of links 86 which are held in assembly by pins (no reference numerals), and also includes a plurality of rollers 88, four rollers being employed in this particular instance. The rollers 88 are rotatably connected to the chain 86 in a customary manner by pins (no reference numerals), and the rollers in function provide a relatively frictionless engagement between the chain 84 and pipe 62.

At one end, the chain carries or is connected to an adjustment means which takes the form of a threaded bar or the like 90 which carries a similarly threaded nut 92. Nut 92 is adapted to abut a plate 94 which is rigidly connected to tubular element 46, the plate and tubular element being rigidly connected in this instance by welding. Bar 90 of the adjustment means is received within a substantially rectangular-shaped passage or port 96 in plate 94.

The opposite end of chain 86 is engaged by a buckle means or buckle generally indicated by the reference numeral 98. Buckle 98 includes a substantially S-shaped link 100 which is pivotally connected to a bar or lever 102 by a bolt 104. Lever 102 is in turn pivotally connected by a bolt 106 to a pair of supporting brackets 108 and 110 which are rigidly connected at one end to tubular member 48, the two brackets being connected to the tubular member 48 in this instance by welding. Bolts 104 and 106 are each provided with heads thereon and are each also adapted to receive a nut, bolt 106 being shown in FIG. 3 as having a head 112 thereon and receiving a nut 114. S-shaped link 100 is adapted to engage the pin in the last link in chain 86, and the buckle provides a means for quickly connecting and disconnecting the chain to-and-from the pipe. With the length of the chain 86 being properly adpusted to fit a given size pipe, the buckle 98 when turned to the "locked" position shown in FIG. 2 will exert just enough force on the chain to urge the pipe 62 firmly into engagement with the pairs of rollers 54–56 and 58–60. While a quickly connectable and disconnectable chain is used in this one specific embodiment of the invention to urge the pipe 62 firmly into engagement with the pairs of rollers it will be apparent that any other suitable means for urging the pipe firmly into engagement with the rollers could be employed.

Figure 6:
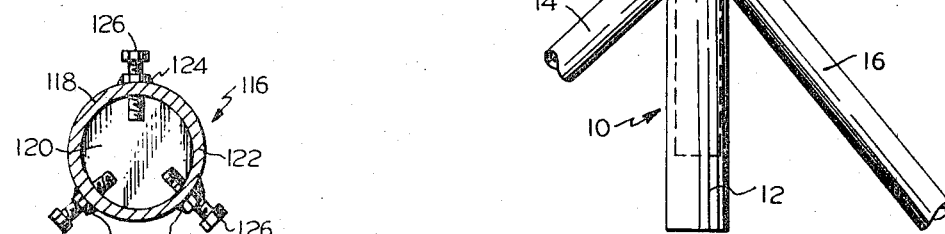
FIG. 6 is an end elevation of the adapter.
Figure 10:
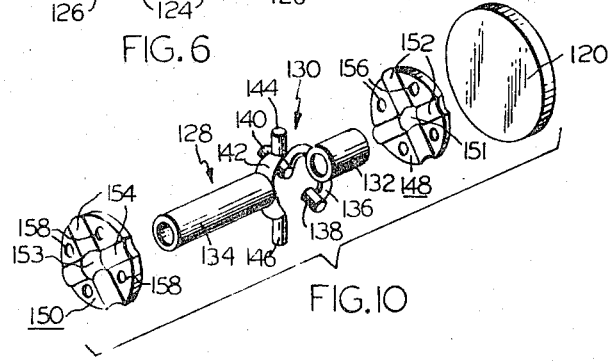
FIG. 10 is an exploded perspective view of the drive shaft and universal joint along with one component of the adapter.

As best seen in FIGS. 5 and 6, the apparatus includes an adapter means or adapter generally designated by the reference numeral 116. The adapter is comprised of a hollow member 118 defined by a side wall 122 and having an end wall 120 at one end thereof and being "open" at the opposite end thereof, the adapter in this instance taking the form of a hollow cylindrical section having a plate welded into one end thereof, the plate thus serving as the end wall 120 of the adapter. Side wall 122 of cylinder 118 is provided in this instance with three circumferentially spaced holes therein (no reference numerals) and the holes are adapted to receive three bolts 126, the holes extending substantially radially of the cylinder 118 and being spaced approximately 120° apart. Three nuts 124 are welded to the outer periphery of the hollow cylinder 118 in alignment with the three holes therein, and the nuts 124 are adapted to be threadedly engaged by the three bolts 126.

The end or extremity of pipe 62 remote from that being worked is received within the hollow cylinder 118 of the adapter and the end of the pipe is adapted to be rigidly connected to the hollow cylinder 118 by the three bolts, the three bolts being movable radially inwardly and outwardly of the hollow cylinder member. Needless to say, the inside diameter of hollow cylinder 118 should be slightly larger than the outside diameter of the largest size pipe with which the adapter is expected to be used.

The apparatus also includes means for providing a universal driving connection between the adapter and the source of rotary power, the universal driving connection in this instance taking the form of a drive shaft with a universal joint therein, the drive shaft being designated by reference numeral 128 and the universal joint being generally designated by the reference numeral 130. The drive shaft 128 having a universal joint therein is thus comprised of two shaft components 132 and 134. The universal joint connects the two shaft components 132 and 134 and some of the universal joint components are carried on the ends of the two shaft components in this particular instance.

Figure 3:
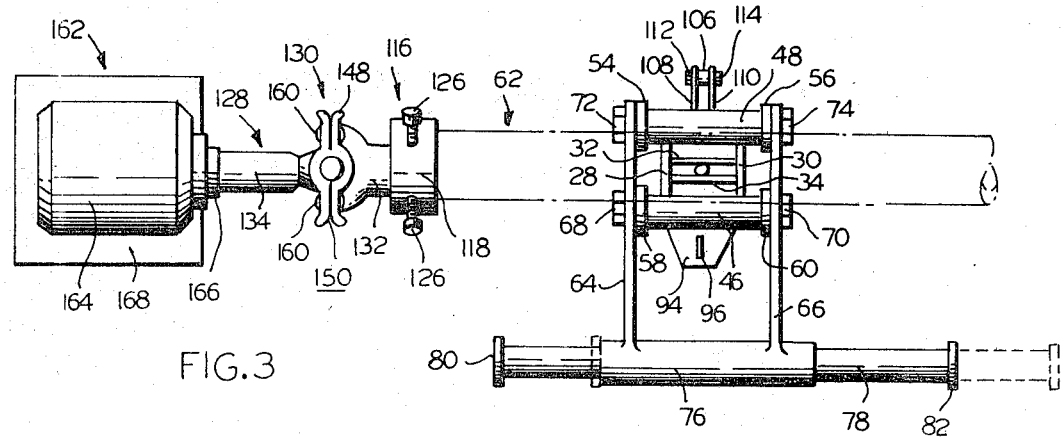
FIG. 3 is a top plan view of the apparatus illustrating the pipe-supporting head and the universal driving connection between a pipe and the power vise.
Figure 4:
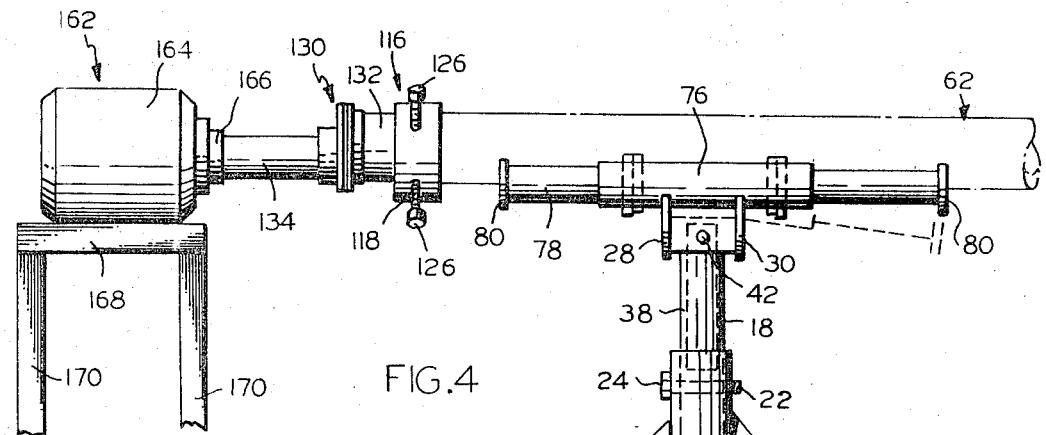
FIG. 4 is a side elevation of the apparatus also illustrating the pipe-supporting head and the universal driving connection between a pipe and the power vise.

One end of shaft component 132 carries a U-shaped member 136 to the ends of which are connected two stub shafts 138 and 140. One end of shaft component 134 also carries a U-shaped member 142 to the ends of which are connected two stub shafts 144 and 146. The four stub shafts are held in assembly to form a universal joint by a pair of plates 148 and 150, which plates are each provided with centrally disposed, enlarged apertures 151 and 153, respectively, therein. Each plate 148–150 is also provided with four radially extending recesses therein spaced approximately 90° apart, plate 148 being provided with four recesses 152 therein and plate 150 being provided with four recesses 154 therein. The four recesses in the two plates are adapted to receive the four stub shafts when the two plates are connected and held in close assembly by means of rivets 160 (FIG. 3). Holes 156 and 158 in the two plates receive the rivets 160. With the two plates riveted together, the components of the universal joint are held in assembly and the two shaft componeots can rotate about two axes defined by the pairs of stub shafts, which axes are spaced approximately 90° apart.

The end of shaft component 132 remote from the universal joint is rigidly connected to end wall 120 of the adapter at the approximate geometric center thereof. Shaft component 132 is welded to the adapter end wall 120 in this particular instance, although it will be appreciated that any other suitable type of connection means could be employed.

The end of shaft component 134 is adapted to be received in the chuck of a portable rotary power source, i.e., a power vise or power drive. A typical power vise is shown in the drawings and is generally designed by the reference numeral 162. The power vise is basically comprised of a housing 164 which houses an electric motor and some gearing (not shown), and the motor acting through the gearing drives a chuck 166 which is adapted to hold or grip a small diameter pipe or, in this instance, shaft component 134. Housing 164 is mounted on a platform or the like 168 and the platform is supported by four legs 170. The power vise is a lightweight and inexpensive piece of equipment and can easily be transported from one work location to another. Power vises are owned and used by practically all plumbers in the trade, and several different models are commercially available. The structural details per se of the power vise shown in the drawings form no part of the present invention, needless to say.

Referring now to FIGS. 11–14, the reamer of the present invention is comprised of a body member 172 which, in this instance, takes the form of a flat plate having a substantially triangular-shaped main portion 174 and an enlarged tang portion 176. Tang portion 176 carries a handle means or handle 178, the handle in this instance being comprised of a hollow cylinder having one end flattened at 180 to provide a substantially rectangular-shaped opening or port 182 in one end of the handle. Tang portion 176 is adapted to fit within the rectangular-shaped opening 182, and the handle 178 is held on the tang portion 176 by the frictional engagement between the two components. Another handle means or handle 184 is carried by body member 172, handle 184 being rigidly connected to the rear or reverse face of the tang portion of the body member. Handle 184 in this instance is welded to the reverse face of the body member, the fillets being shown in FIG. 12. Handle 184 also extends substantially normal to the body member.

Body member 172 also carries guide means which in this one specific embodiment of the invention takes the form of a pair of rollers or cylindrical elements 186 and 188. The two rollers have axially extending passages 190 and 192 therein which receive bolts 198 and 200 which are employed to attach the two rollers to the front face of the body member. Bolts 198 and 200 are received in a pair of holes 194 and 196, respectively, in the body member, the two holes being spaced a predetermined distance apart, as are thus the two rollers. Nuts 202 and 204 are threadedly carried on the ends of the two bolts, and the nuts abut the reverse side of the body member.

Body member 172 is provided with an elongated substantially rectangular-shaped passage or slot 206 therein, the slot being located in body member main portion 174 and extending to one edge of the body member. A pair of plates 208 and 210 are rigidly secured to the reverse face of the body member, each of the plates being secured to the reverse face of the body member along one of their side walls 209 and 211, respectively. The plates 208 and 210 are secured to the body member by welding, in this particular instance, and are positioned on the body member along the opposing edges of slot 206 or in such a manner that one face of each plate is substantially aligned with one of the parallel inner surface walls (no reference numerals) in the body member defining the slot 206. The other side walls of the two plates 208 and 210 or those opposite the two side walls 209 and 211 carry another plate 213 which spans both plates and is secured to the two plates by welding.

Slot 206 receives a blade means or blade generally designated by the reference numeral 212. The blade includes a substantially rectangular-shaped body portion 214 and has a substantially triangular-shaped nose portion 216. One side of the triangular-shaped nose portion is ground along its length at 218 and 220 in this instance to provide a cutting edge 222 along one side of the nose portion, although it will be apparent that the nose portion could be ground to provide two cutting edges. The blade is adapted to slidably fit within the slot 206 with the rectangular-shaped portion 214 thereof being received between plates 208 and 210, the two plates thus functioning as a guide means and plate 213 functioning as a stop.

Plate 210 has a threaded aperture 224 therein which receives a threaded set screw 226, the set screw seating on portion 214 of the blade and thereby functioning as an adjustment means for the blade. The blade can thus be moved substantially transversely of the body member and anchored in any given position in slot 206 between plates 208 and 210, whereby the reamer can be employed to cut pipes of different sizes, particularly those pipes having diameters between 2½″ and 6″.

FIG. 13 shows the reamer in a reaming position or in a position of intended use for the reaming of pipe 62. Assuming that pipe 62 is being driven or rotated and the handles 178 and 184 are being held or supported, the reamer blade is then inserted into the "open" end of the pipe, with roller 188 being positioned against the inner peripheral wall of the pipe and roller 186 being positioned on the outer peripheral wall of the pipe. With the rollers being so positioned, the cutting edge 222 of the blade can be moved into cutting engagement with the inner peripheral edge of the pipe to remove a burr thereon by merely canting or slightly deflecting handle 184.

In practicing the method or methods of the present invention and in using the apparatus to cut, ream and thread a larger diameter pipe, for instance a 6″ pipe, one extremity of the pipe is first inserted into the hollow cylinder 118 of adapter 116. The three bolts 126 are threaded inwardly into engagement with the pipe until the adapter 116 is rigidly secured to the pipe. The pipe need not be accurately centered in hollow cylinder 118 by the bolts 126. Shaft component 134 is then inserted into the chuck of the power vise 162 and the chuck jaws tightened thereon. Conversely, the shaft component 134 could first be secured in the chuck and then the adapter fastened to the pipe.

Pipe 62 adjacent the extremity thereof to be worked is then placed on the pairs of rollers 54–56 and 58–60 of the roller vise. The chain 84 having a length suitable to fit a 6″ pipe is then placed over the pipe 62 and buckled snugly into engagement therewith, the rollers 88 carried by the chain actually engaging the outer peripheral surface of the pipe. The chain must not be buckled too tightly or it will move or "walk" along the pipe when the pipe is rotated. On the other hand, if the chain is buckled too loosely, the pipe will not be held tightly enough against the rollers 54–56 and 58–60 and will thus not move in unison with the rotatable head 26.

The motor of the power vise is then turned-on or energized, and the pipe 62 will be rotated or driven by chuck 166 acting through the universal joint 130 and adapter 116. The tool support member 78 is then slid or moved to the right, as shown in the drawings, and the portion of pipe 62 projecting beyond or extending to the right of the head 26 and the roller vise carried thereby is now ready to be worked.

FIG. 7 shows the apparatus of the present invention being employed in a cutting operation. A conventional cutting tool 228 is first placed on the pipe at the point thereon wherein it is desired to make a cut or in the position shown in the drawings with the handle 230 of the cutting tool resting on tool support member 78. With the pipe 62 being rotated in a counterclockwise direction as viewed from the end of the pipe being worked, the handle of the cutting tool is rotated to move the disc or blade (no reference numeral) of the cutting tool into cutting engagement with the periphery of the pipe. The handle of the cutting tool is rotated until the pipe is completely severed or cut.

FIG. 8 shows the apparatus being used in a reaming operation to remove the burr from the inner peripheral edge of a cut pipe. With the power vise 162 being energized to again drive pipe 62 in a counterclockwise direction, the reamer of the present invention is applied to the end of the pipe 62 as hereinbefore described. Handle 178 of the reamer rests on tool support member 78 during the reaming operation and handle 184 is held by the hand of an operator. Handle 184 is canted slightly to move the cutting edge 222 of the reamer blade 212 into a firm cutting engagement with the inner peripheral edge of the pipe. The reamer will quickly remove the burr from the inner peripheral edge of the pipe.

Following the reaming operation, the pipe is next threaded. FIGS. 9 and 15 show pipe 62 being threaded with a conventional geared threader 232 to apply a right-hand thread. The barrel 234 of the threader is first placed upon the end of the pipe whereupon it is centered on the pipe and is then rigidly attached thereto by means of a set screw (not shown), the set screw thus rigidly anchoring the threader to the end of the pipe. A ratchet 238 having a handle 239 thereon is then placed on the squared end 240 of the shaft of the threader drive pinion 244 with the ratchet being set to prevent rotation of the drive pinion shaft about its own axis and the handle 239 being slidably supported on and abutting tool support arm 78. The power vise 162 is then energized to rotate the pipe 62 again in a counterclockwise direction as shown in FIGS. 9 and 15. With the pipe 62 being so rotated, the threader ring gear 242 will also be rotated in a counterclockwise direction, and the drive pinion 244 being fixed against rotation about its own axis will at the same time move in orbit about the ring gear also in a counterclockwise direction as best shown in FIG. 15. The orbital movement of the drive pinion 244 and its drive shaft will produce rotary movement of the threader die head 236 in a counterclockwise direction and the thread cutting dies 246 will thus be rotated and moved axially inwardly of the end of pipe 62 to cut desired threads on the outer periphery thereof. The cutting dies will be moved axially inwardly of the pipe 62 in spite of the fact that the dies and the pipe 62 are both rotated counterclockwise inasmuch as the die head 236 and the drive pinion will be rotating at a greater speed than the ring gear 242 and the pipe 62. The drive pinion having a much smaller number of teeth thereon than the ring gear will have an orbital speed far greater than the rotational speed of the pipe and ring gear and will thus rotate the die head and dies at the same speed or in excess of the rotational speed of the pipe and ring gear.

In cutting, reaming and threading operations using the apparatus of the present invention, the axis of rotation of pipe 62 need not be aligned with the axis of rotation of the power source, nor need the pipe be accurately centered in the adapter 116. The action of the universal joint will insure that the pipe 62 will be driven by the power source 162 even if the pipe and power source are out of alignment by a large number of degrees either in a horizontal or vertical plane or both. The action of the universal joint will also serve to minimize the eccentricity that is induced into the rotated pipe as a result of misalignment between the pipe and power source.

The action afforded by head 26 will further serve to minimize if not substantially eliminate the eccentricity in the pipe at the extremity thereof being worked. With the pipe 62 being firmly and rotatably secured to the head 26 by the vise means, the head will move or rotate about its axes in response to any eccentric rotation of the pipe and in so doing will not only duplicate the eccentric rotation of the pipe but will enable the pipe to remain firmly in rotatable engagement with the pairs of rollers 54–56 and 58–60 of the vise means as well as the rollers carried by the chain 84. The movement of the head 26 about its axes in response to eccentric rotation of the pipe will thus automatically align the pipe and the vise means and will enable the rotatably driven pipe to be accurately and sequentially cut, reamed and threaded. It will also be appreciated that any movement of the head 26 in response to eccentric rotation of the pipe 62 will produce a corresponding movement of the tool support arm 78. With the handles of the cutting, reaming and threading tools being supported on the tool support arm, the tools will thus move in unison with the head and will not be affected by any eccentric rotation of the pipe.

It will also readily be appreciated that, once the pipe 62 is drivingly connected to the power source 162 and rotatably secured in the vise means, it need not be removed from the apparatus of the present invention for separate work operations. In other words, the pipe may be quickly, accurately and sequentially cut, reamed and threaded in a single work set-up.

Use of the apparatus of the present invention has demonstrated that cutting time in the case of 2½″ pipe is reduced by more than 50% over cutting by hand. In the case of 6″ or larger pipe, cutting time is reduced in excess of 90%.

The use of the apparatus and reamer of the present invention has also demonstrated that reaming time in the case of 2½″–4″ pipe is reduced by at least 50% over conventional methods. In the case of even larger diameter pipe, reaming time is reduced in excess of 90%.

The apparatus and reamer herein described and shown in the drawings are made or constructed of steel in this one specific embodiment of the invention, with the blade of the reamer, of course, being made of tool steel. Other than the blade of the reamer, however, the apparatus and ramer could be constructed of any other suitable material. The apparatus and reamer of the present invention will find primary useage or utility in the plumbing trade but, as will be readily apparent, could also be used in any other trade or work situation wherein it is desired to cut, ream and thread pipe or conduit. Moreover, while the apparatus, reamer and methods of the present invention have particular utility in working pipe in diameter ranges of 2½″–6″, it will be readily apparent that pipe having diameters of less than 2½″ or greater than 6″ could also be worked with equal facility using the apparatus, reamer and methods.

Additional embodiments of the invention in this specification will occur to others and therefore it is intended that the scope of the invention be limited only by the appended claim and not by the embodiment described hereinabove. Accordingly, reference should be made to the following claim in determining the full scope of the invention.

What is claimed is:
1. A method of cutting a pipe comprising the steps of:
establishing a universal driving connection between one end of said pipe and a rotary power source;
rotatably securing said pipe in a vise means supported for movement about multiple axes;
rotating said pipe through said universal driving connection with said power source; and
applying a cutting tool to said rotating pipe at a point intermediate said vise means and the other end of said pipe with the handle of said cutting tool being supported for movement about the axes about which said vise means and rotating pipe are movable.

References Cited
UNITED STATES PATENTS

| | | | |
|---|---|---|---|
| 3,002,205 | 10/1961 | Buyer | 10—89 |
| 3,229,313 | 1/1966 | Conway et al. | 10—107 |
| 3,270,592 | 9/1966 | Behnke | 10—87X |

ANDREW R. JUHASZ, Primary Examiner